United States Patent
Zheng et al.

(10) Patent No.: US 6,980,925 B2
(45) Date of Patent: Dec. 27, 2005

(54) REAL-TIME SIGNAL PROCESSING FOR VEHICLE TIRE LOAD MONITORING

(75) Inventors: Yuhong Zheng, Ann Arbor, MI (US); Danny Milot, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 121 days.

(21) Appl. No.: 10/678,537

(22) Filed: Oct. 3, 2003

(65) Prior Publication Data

US 2005/0075825 A1  Apr. 7, 2005

(51) Int. Cl.[7] .................. G01G 19/03; G01G 19/04; G06F 15/00
(52) U.S. Cl. .............. 702/175; 702/41; 702/42; 702/43; 702/98; 702/138; 702/139; 702/140; 702/141; 702/142; 702/145; 702/148; 702/173; 702/174; 152/415; 152/416; 152/417; 340/679
(58) Field of Search ............... 702/41–43, 98, 702/173–175; 152/415–417

(56) References Cited

U.S. PATENT DOCUMENTS

| | | | | |
|---|---|---|---|---|
| 5,749,984 A | * | 5/1998 | Frey et al. ............. | 152/415 |
| 5,954,407 A | | 9/1999 | Schramm et al. | |
| 2003/0030553 A1 | | 2/2003 | Schofield et al. | |
| 2003/0048178 A1 | | 3/2003 | Bonardi et al. | |
| 2003/0058118 A1 | * | 3/2003 | Wilson ............... | 340/679 |
| 2003/0080860 A1 | | 5/2003 | Stewart et al. | |
| 2003/0080862 A1 | | 5/2003 | Kranz | |
| 2003/0102966 A1 | | 6/2003 | Konchin et al. | |
| 2003/0112138 A1 | | 6/2003 | Marguet et al. | |
| 2003/0117276 A1 | | 6/2003 | Marguet et al. | |
| 2003/0117277 A1 | | 6/2003 | Marguet et al. | |

OTHER PUBLICATIONS

MacAdam, F. Blower C., Z. Bareket D., Blowout Resistant Tire Stufy for Commercial Highway Vehicles, Aug. 31, 2000, http://www.retread.org/PDF/umtris.pdf.*

* cited by examiner

Primary Examiner—John Barlow
Assistant Examiner—Sujoy K. Kundu
(74) Attorney, Agent, or Firm—MacMillan, Sobanski & Todd, LLC

(57) ABSTRACT

A system for real-time signal processing for vehicle monitoring, including a first device disposed in a tire of a vehicle and producing a signal that is a function of a tire contact time period, during which a point at the tire circumference stays in contact with the ground, and a second device operative to repetitively perform a first task of processing the signal to calculate the tire contact time period at a first predetermined rate, and to repetitively perform a second task of calculating a tire load based at least in part upon the calculated tire contact time period at a second predetermined rate, wherein said second predetermined rate is less than said first predetermined rate.

17 Claims, 6 Drawing Sheets

REAL-TIME SIGNAL PROCESSING FOR VEHICLE TIRE LOAD MONITORING

BACKGROUND OF THE INVENTION

This invention relates in general to methods, systems, and apparatuses for processing signals for vehicle monitoring and specifically to methods, systems, and apparatuses for real-time processing of sensor signals for vehicle tire load monitoring.

A typical automotive vehicle may include many monitoring and control systems, for example, a cruise assist system (cruise control), an Anti-Lock Braking System (ABS), an Anti-Theft Vehicle Protection System (AVP), a Global Positioning System (GPS), and a variety of lighting, safety, climate control, and audio systems, just to name a few. These systems include many different components; including, for example, sensors, processors, transmitters, receivers, memory devices, etc. There are many varieties of each component device, for example, the sensors in an automotive vehicle may include tachometers, accelerometers, thermostats, pressure gauges, photo-electric sensors, angle sensors, yaw-rate sensors, etc.

One type of automotive vehicle system is a Tire Load Monitoring System (TLMS) disclosed in, for example, U.S. Pat. App. Pub. No. U.S. 2003/0058118 A1 published Mar. 27, 2003 in the name of Kitchener C. Wilson (herein after, "the Wilson application"), the disclosures of which are incorporated herein by reference. The Wilson application discloses an accelerometer-based TLMS that estimates tire load information based upon tire contact patch length. The tire contact patch length is calculated from the time period during which a point on the tire circumference stays in contact with the ground. In order to accomplish tire load monitoring in typical dynamic driving situations, the rate of data acquisition typically needs to be at least about 10 kHz to capture the signal from an accelerometer placed in the tire with sufficient resolution and accuracy in order to be useful in determining the tire load.

FIG. 1 is a simplified block diagram of the known real-time tire monitoring system of the Wilson application, shown generally at 30. The system 30 is incorporated in a vehicle 32 having a plurality of wheels 34 each carrying a tire 36 mounted on a rim 38. The tires 36 are shown in their loaded condition, and accordingly each has a flattened deflection contact region 40 in contact with a load-bearing surface (ground), such as a road 42.

The tire monitoring system 30 generally includes a contact region detector 50 and an associated receiver-transmitter 52 within each tire 36; a tire identifying plaque 54 attached to the sidewall of each tire; and a receiver 56, data processor 58, a distributed control subsystem 60, a data storage unit 62, an operator display 64, a remote receiver-transmitter 66 and a data bus 68 within the vehicle 32. The monitoring system 30 further includes, remote from the vehicle, a remote monitor receiver-transmitter 70 for communicating information to and from the vehicle 32; a console 72 through which a technician interacts with the vehicle 32; a magnetic wand 74 to identify the physical locations of the tires; and a tire identifying plaque scanner 76 to read the parameter information on the tire identifying plaque 54.

Generally, the contact region detector 50 functions to detect tire load-induced deflections, to time the load-induced tire deflection duration and periodicity, and to reduce signal noise. The receiver-transmitter 52 serves to receive the timing information from the contact detector 50, measure tire pressure and temperature, and transmit these data to the vehicle receiver 56. The tire identifying plaque 54 on each tire 36 carries machine-readable data relating to parameter values specific to the tire model. The in-vehicle receiver 56 is adapted to receive data transmissions from all tires 36. The data processor 58 determines tire deformation, tire load, tire molar (air) content, vehicle mass, and the distribution of vehicle mass. The distributed control system 60 includes adaptive vehicle subsystems such as brakes 60a, steering 60b, suspension 60c, engine 60d, transmission 60e, and so forth, that respond in predetermined fashions to the load, the vehicle mass and the distribution of the vehicle mass. The data storage unit 62 stores the values of parameters and of interim calculations while the operator display 64 provides status information and warnings. The remote receiver-transmitter 66 sends information to the remote monitor receiver-transmitter 70. The data bus 68 interconnects the system components.

The known approach taken to the detection of the deflection region of a loaded tire is to sense the acceleration of the rotating tire by means of an accelerometer mounted on the tire, preferably within the tire and more preferably on the inner tread lining of the tire. As the tire rotates and the accelerometer is off the flat deflection region, a high centripetal acceleration is sensed. Conversely, when the accelerometer is on the flat deflection region and not rotating, a low acceleration is sensed. The deflection points are determined at the points where the acceleration transitions between the high and low values.

SUMMARY OF THE INVENTION

This invention relates to methods, systems, and apparatuses for real-time vehicle monitoring signal processing. In one embodiment, a method includes separating processing tasks into a fast task portion and a slow task portion. The fast task portion and slow task portion are performed at different rates. Optionally, the fast task portion and the slow task portion may be coordinated with the transmission of coordination flags. Further, information relating to the tasks may also be transmitted in relation to the flags.

DETAILED DESCRIPTION OF THE PREFERRED EMBODIMENT

Figure 1:
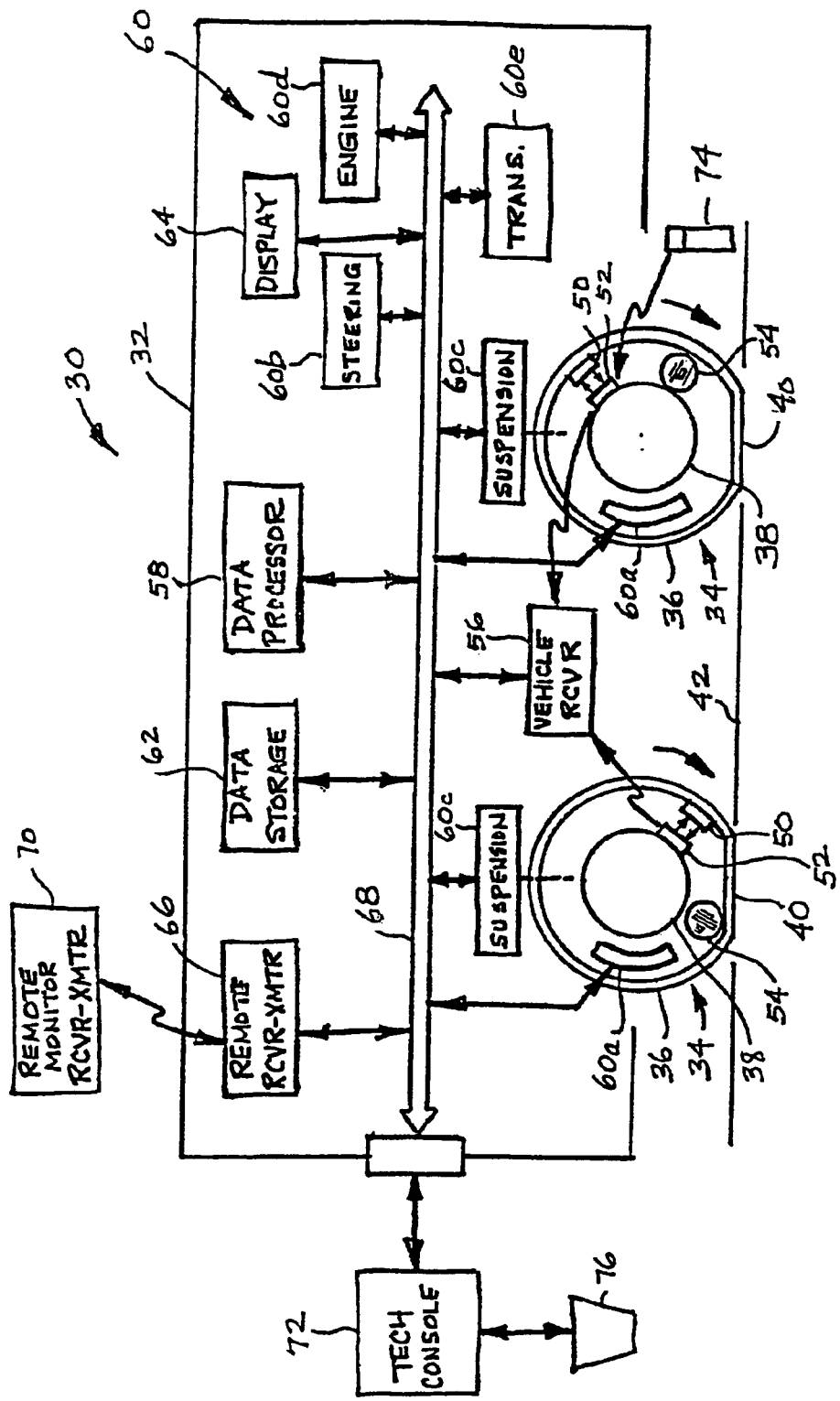
FIG. 1 is a simplified block diagram of a known real-time tire monitoring system.
Figure 2:
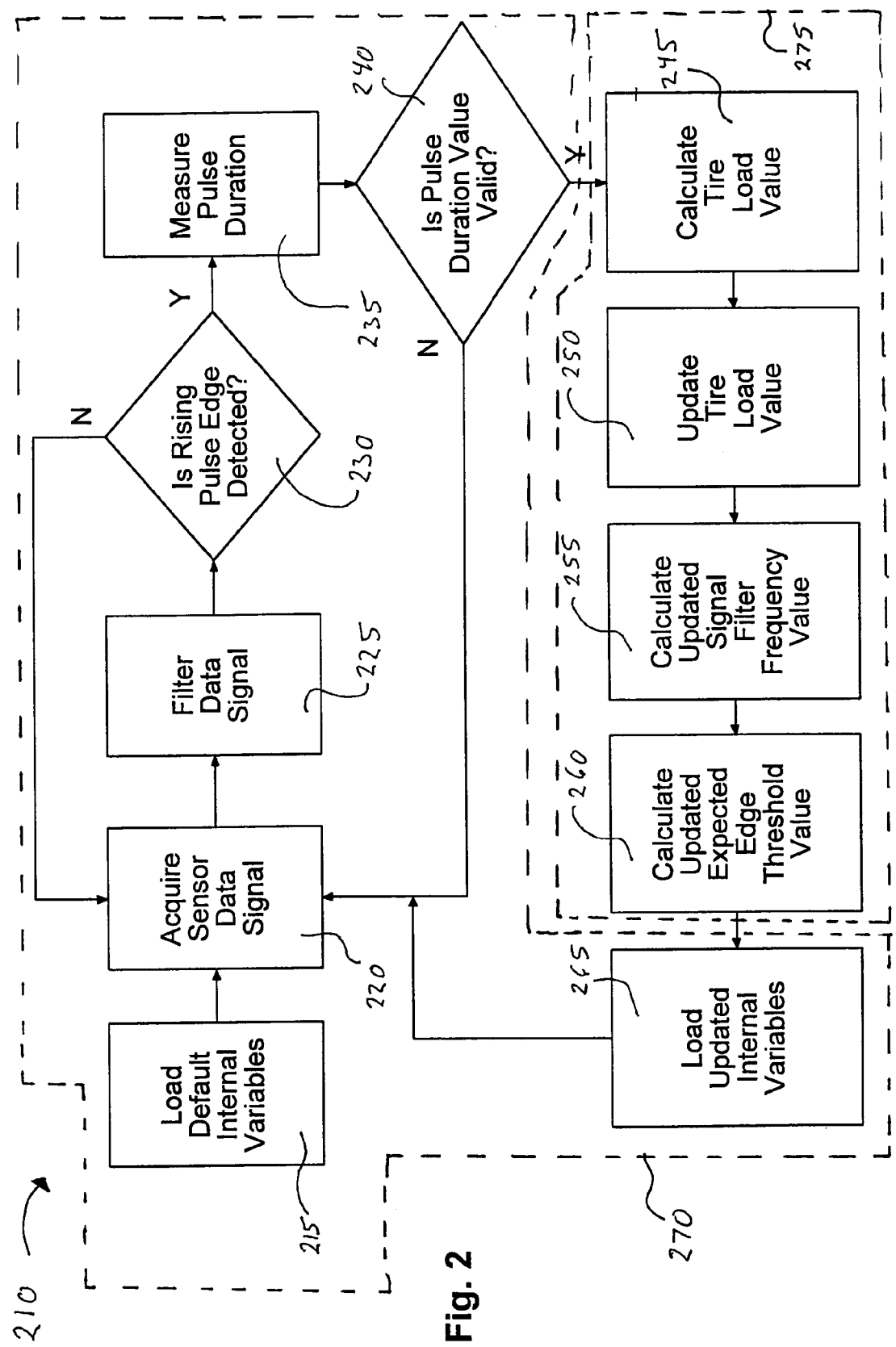
FIG. 2 is a flowchart of a process for real-time tire load monitoring.

FIG. 2 is a flowchart of a process for real-time tire load monitoring 210, which, for example, may be used in the system 30 of the Wilson application. The process 210 begins in functional block 215 where a set of default internal variables are loaded into a real-time tire monitoring system, for example the system 30 of FIG. 1. The set of variables preferably includes a signal filter frequency value and an expected edge threshold value.

The process 210 proceeds to functional block 220 where the system 30 acquires data from a contact patch sensor, such as the contact patch region detector 50. Preferably, the data is acquired by receiving a data signal from a transmitter associated with an accelerometer based contact patch sensor, such as the receiver-transmitter 52.

The process 210 then proceeds to functional block 225 where the system 30 filters the data signal. The system 30 sets a frequency range for allowable data signal in order to reduce false data signals. Preferably, the system 30 sets the frequency range as a function of the signal filter frequency value.

In decision block 230, the system 30 detects for a rising pulse edge in the allowable data signal. If the rising pulse edge is not detected then the process 210 returns to functional block 220 and proceeds as before. If the rising pulse edge is detected then the process 210 proceeds to functional block 235 where the system 30 measures the duration of a pulse in the allowable data signal to generate a pulse duration value.

In decision block 240, the system 30 analyzes the pulse duration value for validity. If the pulse duration value is not valid then the process 210 returns to functional block 220 and proceeds as before. If the pulse duration value is valid then the process 210 proceeds to functional block 245 where the system 30 calculates a tire load value, as least partially based upon the pulse duration value.

The process 210 proceeds to functional block 250 where the tire load value calculated is used to update a tire load value stored in the system 30.

The process 210 then proceeds to functional block 255 where the system 30 calculates an updated signal filter frequency value.

The process 210 then proceeds to functional block 260 where the system 30 calculates an updated expected edge threshold value.

The process then proceeds to functional block 265 where the updated internal variables are loaded in place of the internal variables previously used in the calculations in the system 30.

The process 210 then returns to functional block 220, continues through as before, and runs until stopped by some outside interrupt, such as the system 30 being turned off or as will be described below.

The Process 210 for real-time tire load monitoring consists of a signal processing portion, as generally indicated by a dashed line 270, and a values calculation portion, as generally indicated by a dashed line 275. The process 210 continually proceeds though the signal processing and then the value calculations, both portions occurring once per a single processing period.

In order to accomplish tire load monitoring in dynamic driving situations, the signal processing portion needs to run at about 10 kHz (kilohertz) or faster; thus, typically the process 210 is running at least at about 10 kHz or faster.

Figure 3:
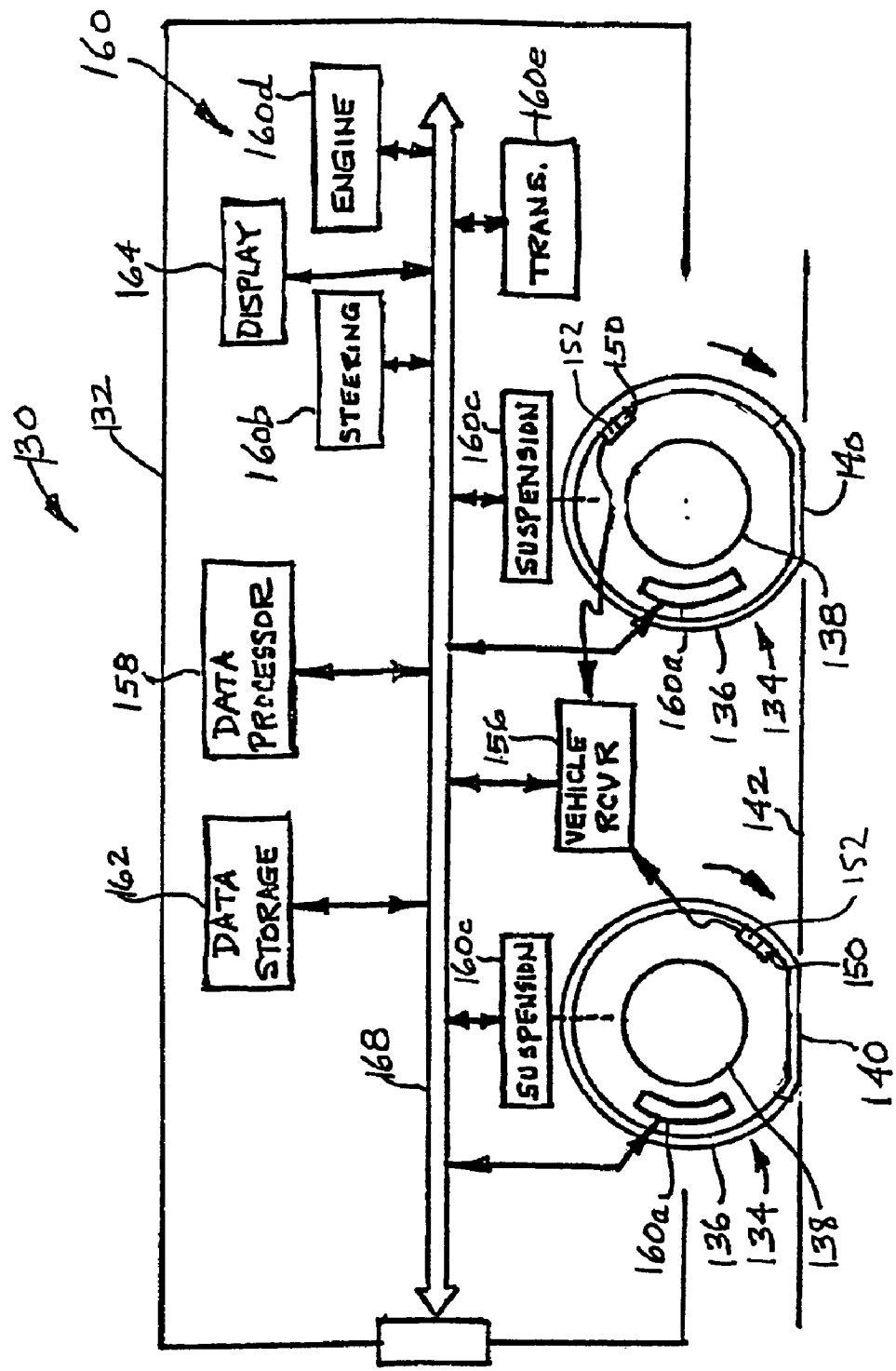
FIG. 3 is a simplified block diagram of a real-time tire monitoring system in accordance with the present invention.

FIG. 3 is a simplified block diagram of a real-time tire monitoring system in accordance with the present invention, shown generally at 130. The system 130 is entirely incorporated in a vehicle 132 having a plurality of wheels 134 each carrying a tire 136 mounted on a rim 138. The tires 136 are shown in their loaded condition, and accordingly each has a flattened deflection contact region 140 in contact with a load-bearing surface (ground), such as a road 142.

The tire monitoring system 130 generally includes a contact region detector 150, including, for example, an accelerometer, a microprocessor, and an associated receiver-transmitter 152 within each tire 136. Preferably, the contact region detector 150 and the associated receiver-transmitter 152 are integrated and mounted on the tire 136. However, the contact region detector 150 and the associated receiver-transmitter 152 may be separated, for example as the contact region detector 50 and the associated receiver-transmitter 52 are in the Wilson application. Further, the contact region detector 150 and the associated receiver-transmitter 152 may be connected by any suitable manner, such as electrical wiring, RF transmission, or optical interface. The system 130 further generally includes a vehicle receiver-transmitter 156, a data processor 158, a distributed control subsystem 160, a data storage unit 162, an operator display 164, and a data bus 168 within the vehicle 132.

Generally, the contact region detector 150 functions to detect tire load-induced deflections, to time the load-induced tire deflection duration and periodicity, and to reduce signal noise. The associated receiver-transmitter 152 serves to receive and transmit information to and from the contact detector 150, and the vehicle receiver-transmitter 156. The associated receiver-transmitter 152 may also receive and transmit additional information, such as tire pressure and temperature, which may be received from a pressure sensor (not shown) and a temperature sensor (not shown), within each tire 136. The in-vehicle vehicle receiver-transmitter 156 is adapted to receive and transmit data transmissions to and from all tires 136. The data processor 158 determines tire deformation, and tire load. Additionally, the data processor may also determine the amount of air in the tire (i.e. the tire molar air content), vehicle mass, and the distribution of vehicle mass. The distributed control system 160 includes adaptive vehicle subsystems such as brakes 160*a*, steering 160*b*, suspension 160*c*, engine 160*d*, transmission 160*e*, and so forth, that may respond in predetermined fashions to the load, the vehicle mass and the distribution of the vehicle mass. The data storage unit 162, preferably a RAM module, stores the values of parameters and of interim calculations while the operator display 164 provides status information and warnings. The data bus 168 interconnects the system components.

The approach of the present invention taken to the detection of the deflection region of a loaded tire is to sense the acceleration of the rotating tire by means of the accelerometer of the detector 150 mounted on the tire 136, preferably on the interior surface of the tire 136 and more preferably on the inner tread lining of the tire 136. As the tire 136 rotates and the accelerometer is off the flat deflection region, a high centripetal acceleration is sensed. Conversely, when the accelerometer is on the flat deflection region and not rotating, a low acceleration is sensed. The deflection points are determined at the points where the acceleration transitions between the high and low values.

Figure 4:
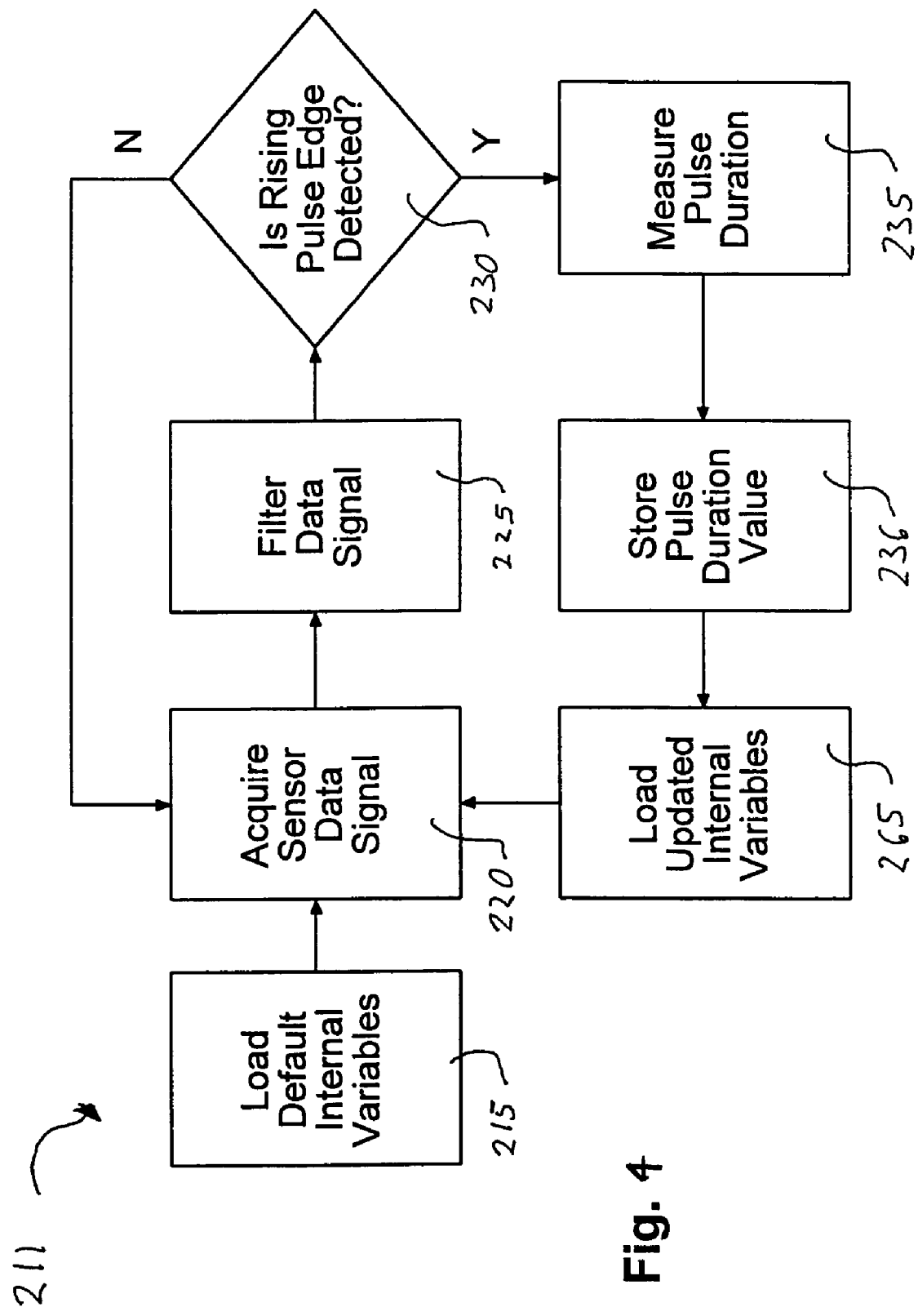
FIG. 4 is a flowchart of a fast task portion of a process for real-time tire load monitoring in accordance with the present invention.
Figure 5:
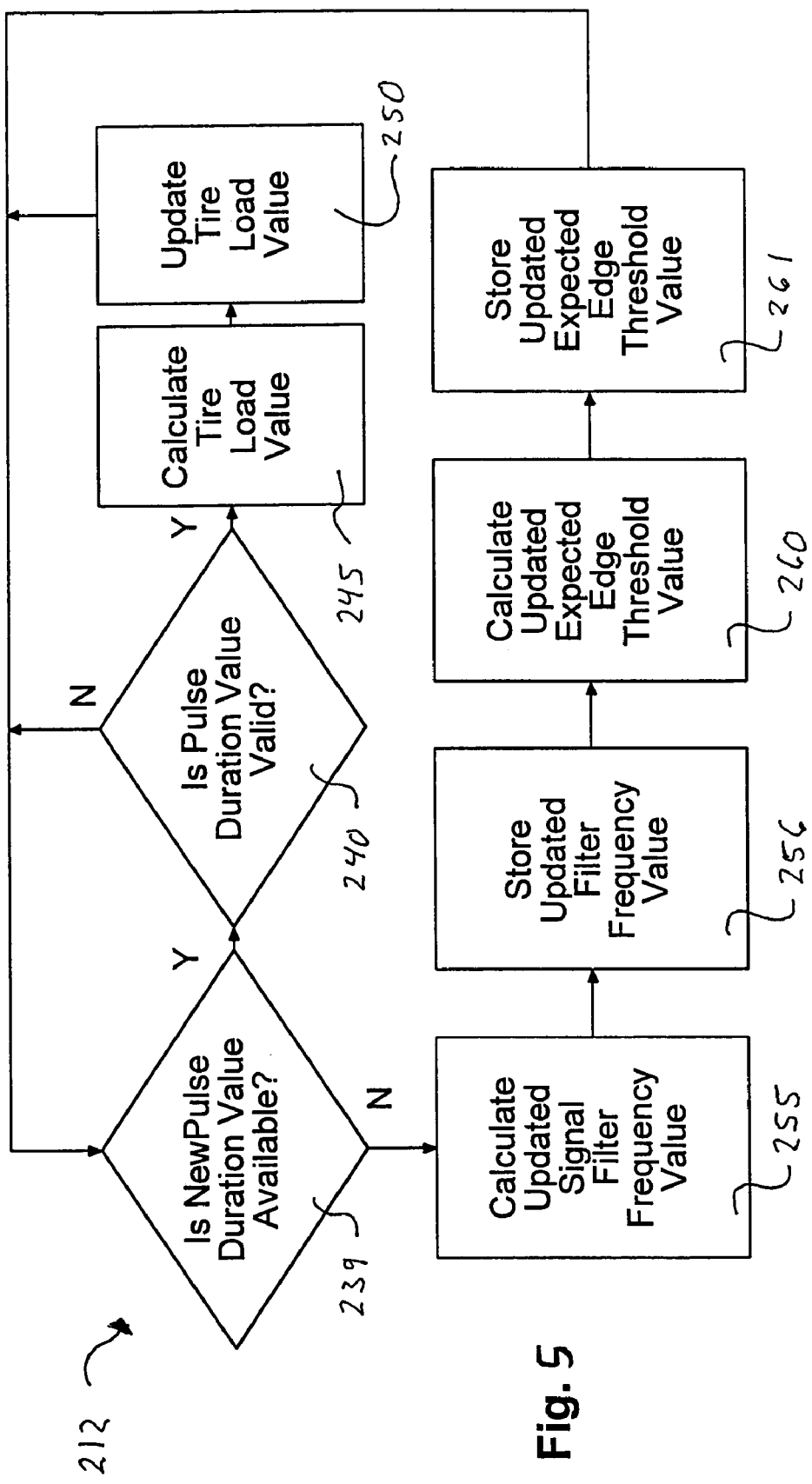
FIG. 5 is a flowchart of a slow task portion of a process for real-time tire load monitoring in accordance with the present invention.

In one embodiment of the present invention, a process for real-time tire load monitoring, which, for example, may be used in the system 130, the signal processing and values calculation processes are broken down to two sub-task portions, i.e. a fast task portion 211, as shown in FIG. 4, and a slow task portion 212, as shown in FIG. 5.

FIG. 4 is a flowchart of the fast task portion 211 of a process for real-time tire load monitoring in accordance with the present invention. Preferably, the fast task portion 211 is running at the same sample rate as data acquisition, typically about 10 kHz. However, the fast task portion 211 may be running at a rate faster or slower than the sample rate of data acquisition.

Preferably the fast task portion 211 has access to a common data storage, such as the common data storage 162 of the system 130, where the fast task portion 211 can, for example, access default internal variables and updated internal variables, and store values, for example, a pulse duration value. The fast task portion 211 may have direct access to the common data storage, such as through a wired or wireless interface, or the fast task portion 211 may have indirect access to the common data storage, such as through a command processor. For example, the data processor 158 of the system 130 may act as such a command processor.

The fast task portion 211 begins in functional block 215 where a set of default internal variables is loaded into the real-time tire monitoring system 130. The set of variables preferably includes a signal filter frequency value and an expected edge threshold value.

The fast task portion 211 proceeds to functional block 220 where the system 130 acquires data from the contact patch sensor 150. Preferably, the data is acquired by receiving a data signal from the receiver-transmitter 152 associated with the accelerometer based contact patch sensor 150.

The fast task portion 211 then proceeds to functional block 225 where the system 130 filters the data signal. Preferably, the system 130 uses the signal filter frequency value to filter the data signal.

In decision block 230, the system 130 detects for a rising pulse edge in the data signal. If the rising pulse edge is not detected then the fast task portion 211 returns to functional block 220 and proceeds as before. If the rising pulse edge is detected then the fast task portion 211 proceeds to functional block 235 where the system 130 measures the duration of a pulse in the data signal to generate a pulse duration value.

The fast task portion 211 proceeds to functional block 236 where the system 130 stores the pulse duration value, preferably in the common data storage 162. It must be understood, however, that the fast task portion 211 may store the pulse duration value in any suitable module. For example, in an alternative embodiment of the invention, the fast task portion 211 stores the pulse duration value in a command processor. In one embodiment of the invention, the data processor 158 of the system 130 acts as such a command processor.

The fast task portion 211 then proceeds to functional block 265 where updated internal variables are loaded in place of the internal variables currently being used in the system 130, preferably retrieved from the common data storage 162.

The fast task portion 211 then returns to functional block 220 and continues through as before and runs until stopped by some outside interrupt, such as, the system 130 being turned off or as will be described below.

FIG. 5 is a flowchart of the slow task portion 212 of a process for real-time tire load monitoring in accordance with the present invention. Preferably, the slow task portion 212 is running at a sample rate as slower than the rate of data acquisition, i.e. slower than the rate of the fast task portion 211. Typically, the sample rate of the slow task portion 212 is greater than the duration of one wheel rotation. For example, at 80 mph (miles per hour) a typical vehicle wheel is rotating at about 15 Hz (hertz). The typical rate of data acquisition is about 10 kHz. As discussed above the fast task portion 211 would preferably be running at least at about the same rate as the rate of data acquisition, and thus the fast task portion typically would be running at about 10 kHz.

Thus, in this example the slow task portion would be preferably running at a rate between about 15 Hz and about 10 kHz. Generally, the slow task portion 212 performs updated filter frequency calculation, updated expected edge threshold calculation, and tire load calculation, as will be described below.

Preferably, the slow task portion 212 has access to the common data storage, such as the common data storage 162 of the system 130, where the slow task portion 212 can, for example, access vehicle sensor data, such as wheel speed and tire inflation. The slow task portion 212 may have direct access to the common data storage, such as through a wired or wireless interface, or the slow task portion 212 may have indirect access to the common data storage, such as through a command processor. For example, the data processor 158 of the system 130 may act as such a command processor.

Preferably, the slow task portion 212 will use instantaneous wheel speed information to calculate a contact patch length from a contact time period and in turn calculate tire load. Further, the slow task portion 212 will preferably use instantaneous wheel speed information to calculate an updated filter frequency, and an updated expected edge threshold in order to deal with dynamic driving situations when wheel speeds change significantly between two adjacent pulses in the acceleration signal.

The slow task portion 212 begins in decision block 239 where a real-time tire monitoring system 130 queries for a new pulse duration value. If the new pulse duration value is available then the slow task portion 212 proceeds to decision block 240.

In decision block 240, the system 130 analyzes the pulse duration value for validity. If the pulse duration value is not valid then the slow task portion 212 returns to decision block 239 and proceeds as before. If the pulse duration value is valid then the slow task portion 212 proceeds to functional block 245 where the system 130 calculates a tire load value, as least partially based upon the pulse duration value.

The slow task portion 212 proceeds to functional block 250 where the tire load value calculated is used to update a tire load value stored in the system 130. The slow task portion 212 then returns to decision block 239 and proceeds as before.

If in decision block 239 the new pulse duration value is not available then the slow task portion 212 proceeds to functional block 255 where the system 130 calculates an updated signal filter frequency value. The slow task then proceeds to functional block 256 where the system 130 stores the updated signal filter frequency value.

The slow task portion 212 then proceeds to functional block 260 where the system 130 calculates an updated expected edge threshold value. The slow task then proceeds to functional block 261 where the system 130 stores the updated expected edge threshold value.

The slow task portion 212 then returns to decision block 239 and continues through as before and runs until stopped by some outside interrupt, such as, the system 130 being turned off or as will be described below.

In one embodiment of the present invention, a process for real-time tire load monitoring consists of the fast task portion 211, as generally exemplified in FIG. 4, and the slow task portion 212, as generally exemplified in FIG. 5. The fast task portion 211 preferably continually proceeds though signal processing and the slow task portion 212 preferably continually proceeds through value calculation, both portions cycle once per a respective processing period. Preferably, each respective period is less than the duration of one wheel rotation. However, the cycle of each portion is independent of the other, and may run asynchronously, i.e. without temporal concurrence, and/or asequentially, i.e. run without succeeding or following in order.

Further, in one embodiment of the present invention execution of a fast task portion and a slow task portion of a process for real-time tire load monitoring is not scheduled in a conventional process time-sharing way, i.e. where a fast task portion takes priority over a slow task portion. Two exemplary schemes are described as follows.

Figure 6:
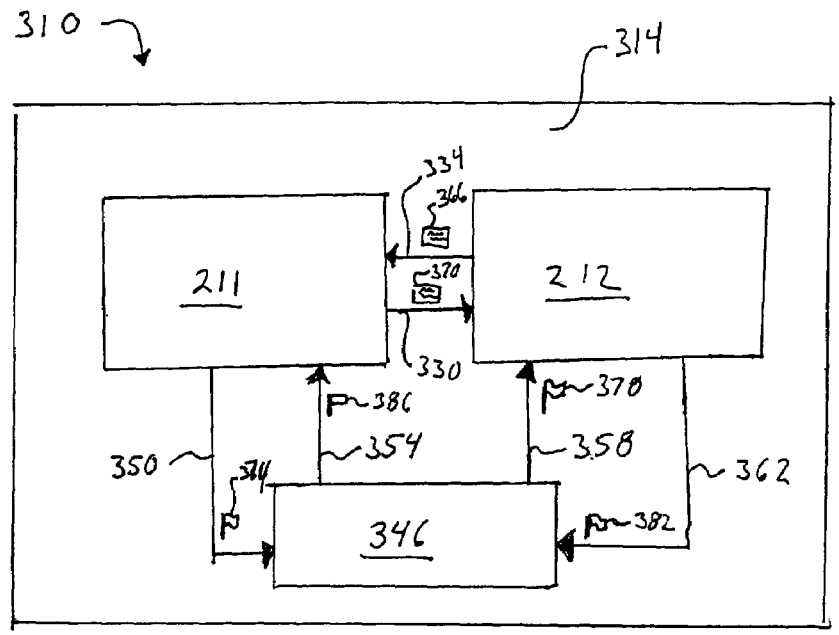
FIG. 6 is a schematic of a Serial Processing Scheme in accordance with the present invention.

Referring again to the drawings, FIG. 6 schematically illustrates a serial-processing scheme, indicated generally at 310. The serial-processing scheme 310 includes a single microprocessing system 314. The fast task portion 211 and the slow task portion 212 of a process for real-time tire load monitoring in accordance with a first embodiment of the present invention are programmed into the single microprocessing system 314. The fast task portion 211 is communicatively connected to the slow task portion 212 by a first communications pathway 330. The slow task portion 212 is communicatively connected to the fast task portion 212 by a second communications pathway 334. The fast task portion 211 and the slow task portion 212 are executed during different portions of a processing cycle, as will be described below. The processing cycle corresponds to a sensor data signal period, preferably a signal period of a transmitter associated with an accelerometer based contact patch sensor, preferably, the contact region detector 150 of the tire monitoring system 130.

The fast task portion 211 is further communicatively connected to a task scheduler process 346 by a third communications pathway 350. The task scheduler process 346 is communicatively connected to the fast task portion 211 by a fourth communications pathway 354. The task scheduler process 346 is further communicatively connected to the slow task portion 212 by a fifth communications pathway 358. The slow task portion 212 is communicatively connected to the task scheduler process 346 by a sixth communications pathway 362.

The single microprocessing system 314 is preferably placed with the accelerometer of the detector 150, embedded inside the tire 136. For example, the single microprocessing system 314 may be the microprocessor included in the detector 150. However, it will be appreciated that the single microprocessing system 314 may be placed in any appropriate location within a vehicle. For example, the single microprocessing system 314 may be the data processor 158 included in the system 130. In an alternate embodiment of the invention where the single microprocessing system 314 is the data processor 158, the detector 150 does not include a microprocessor.

For practical application, signal processing and value calculation processes are broken down into the two sub-tasks portion, the fast task portion 211, and the slow task portion 212. The fast task portion 211 performs loading of internal variables 366, acquisition of an acceleration signal, filtering of the signal, detection of a rising pulse edge, measurement of a pulse duration, and transmission of a pulse duration value 370. Preferably, the fast task portion 211 performs all functions at the same rate as the sample data acquisition rate, i.e. within the processing cycle corresponding to the sensor data signal period. The pulse duration value 370 is transmitted from the fast task portion 211 to the slow task portion 212 via the first communications pathway 330, preferably through a common data storage module, such as a RAM module. A first coordination flag 374 is transmitted from the fast task portion 211 to the task scheduler process 346 via the third communications pathway 350 to indicate that the fast task portion 211 has fully performed one of its functions.

The task scheduler process 346 transmits a second coordination flag 378 to the slow task portion 212 via the fifth communication pathway 358 to enable the slow task portion 212 to execute. The slow task portion 212 calculates updated filter frequency value and expected edge threshold value, transmits the updated filter frequency value and expected edge threshold value as internal variables 366, performs duration value validity analysis, and calculation of tire load. Preferably, the slow task portion 212 is running at a slower sample rate than the fast task portion 211. Additionally, the slow task portion 212 has access to wheel speed sensor data and tire inflation sensor data. In order to deal with dynamic driving situations, such as when wheel speeds change significantly between two adjacent pulses in the acceleration signal, instantaneous wheel speed information is used to assist in calculating contact patch length, updated filter frequency value, and expected edge threshold value. The internal variables 366, the updated filter frequency value, and the updated expected edge threshold value, are transmitted from the slow task portion 212 to the fast task portion 211 via the second communications pathway 334. A third coordination flag 382 is transmitted from the slow task portion 212 to the task scheduler process 346 via the sixth communications pathway 362 to indicate that the slow task process 322 has fully performed one of its functions.

The task scheduler process 346 transmits a fourth coordination flag 386 to the fast task portion 211 via the fourth communication pathway 354 to enable the fast task portion 211 to execute. The fast task portion 211 loads the internal variables 366. The fast task portion 211 then performs acquisition of the acceleration signal, filtering of the signal, detection of the rising pulse edge, measurement of the pulse duration, and transmission of the pulse duration value 370 and the process continues through the cycle as before.

Although the fast task portion 211 may be executed to perform different functions during the processing cycle, it is preferred that the slow task portion 212 is executed only once during the processing cycle. The invention contemplates loading the internal variables, i.e. updating the signal filter frequency value and expected edge threshold value, within the cycle in the acceleration signal. However, the fast task portion 211 would be executed as a time-sharing multi-rate task and the slow task portion 212 would be executed once within the cycle following the completion of detecting a rising pulse edge and the fast task portion 211 would be executed subsequently to finish.

Figure 7:
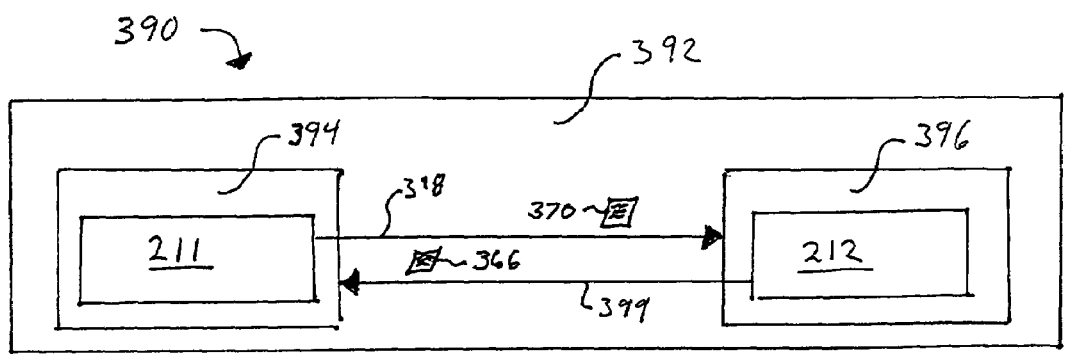
FIG. 7 is a schematic of a Parallel Processing Scheme in accordance with the present invention.

FIG. 7 illustrates a Parallel Processing Scheme indicated generally at 390. The Parallel Processing Scheme 390 includes a dual microprocessing system 392. The fast task portion 211 and the slow task portion 212 of a process for real-time tire load monitoring in accordance with a second embodiment of the present invention are executed in two separate microprocessors, a first microprocessor 394 and a second microprocessor 398, respectively.

In the dual microprocessing system 392, the first microprocessor 394 containing the fast task portion 211 is preferably placed with the accelerometer of the detector 150, embedded inside the tire 136, and the second microprocessor 398 is preferably placed elsewhere in the vehicle 132. For example, while the first microprocessor 394 may be the microprocessor included in the detector 150, the second microprocessor 398 may be the data processor 158 included in the system 130. However, it will be appreciated that the first microprocessor 394 and the second microprocessor 398 may be placed in any appropriate location within a vehicle.

The fast task portion 211 performs loading of internal variables 366, acquisition of an acceleration signal, filtering of the signal, detection of a rising pulse edge, measurement of a pulse duration, and transmission of a pulse duration value 370.

The pulse duration value 370 is transmitted from the fast task portion 211 to the slow task portion 212 via a first communications pathway 398, through a common data storage module, such as a RAM module, preferably the data storage unit 162 of the system 130.

The slow task portion 212 calculates updated filter frequency value and expected edge threshold value, transmits the updated filter frequency value and expected edge threshold value as the internal variables 366, performs duration value validity analysis, and calculation of tire load The internal variables 366, i.e. the updated filter frequency value and expected edge threshold value, are transmitted from the slow task portion 212 to the fast task portion 211 via a second communications pathway 399.

Preferably, the fast task portion 211 loads the internal variables and then performs acquisition of the acceleration signal, filtering of the signal, detection of the rising pulse edge, measurement of the pulse duration, and transmission of the pulse duration value 370 and then continues through the cycle until stopped by some outside interrupt, such as the system being turned off or input of a stop command from elsewhere in the system 130.

Although, the Parallel Processing Scheme 390 has been described for use with one wheel, the invention contemplates a scheme where the first microprocessor 394, embedded in one or more wheels, performs the fast task portion 211 for each the wheels in which the first microprocessor 394 is embedded, and where the second microprocessor 396 performs the slow task portion 212 for all of the wheels in which a first microprocessor 394 is embedded.

In summary, the invention may include various aspects, which differ from the prior art and provide advantages over the prior art. While the principal and mode of operation of this invention have been explained and illustrated in its preferred embodiment, it must be understood that this invention may be practiced otherwise than as specifically explained and illustrated without departing from its spirit or scope.

What is claimed is:

1. A system for determining the tire load of a vehicle comprising:
   a first device disposed in a tire of a vehicle and producing a signal that is a function of a tire contact time period, during which a point at the tire circumference stays in contact with the ground; and
   a second device operative to repetitively perform a first task of processing the signal to calculate the tire contact time period at a first predetermined rate, and to repetitively perform a second task of calculating a tire load based at least in part upon the calculated tire contact time period at a second predetermined rate;
   wherein said second predetermined rate is less than said first predetermined rate.

2. The system of claim 1 wherein the first device includes an accelerometer.

3. The system of claim 2 where in the second device includes a single microprocessor.

4. The system of claim 3 where in the microprocessor is disposed in the tire.

5. The system of claim 2 wherein the second device includes at least a first microprocessor and a second microprocessor.

6. The system of claim 5 wherein the first microprocessor is operative to perform the first task and the second microprocessor is operative to perform the second task.

7. The system of claim 6 wherein the two microprocessors run asynchronously.

8. The system of claim 7 wherein the first microprocessor disposed in the tire.

9. The system of claim 8 wherein there exist two-way communications between the two microprocessor.

10. A method of processing data for determining tire load of a vehicle comprising the steps of:
    a) detecting from a signal a pulse that is a function of tire contact time;
    b) performing one of a first task of calculating tire load based at least in part upon the pulse detected and a second task of updating at least one of a frequency of a signal filter and an expected pulse amplitude of the signal; and
    c) performing the other of the first task and the second task;
    wherein the tasks are performed asequentially.

11. The method of claim 10 wherein step a) is performed based in part upon the filter frequency and/or the expected pulse amplitude updated in step b).

12. A method of processing data for determining a load on a tire of a vehicle comprising the steps of:
    a) detecting from a signal a pulse that is a function of tire contact time; and
    b) calculating a tire load based at least in part upon the pulse detected;
    wherein step b) is occurring at a rate slower than the rate at which step a) is occurring.

13. The method of claim 12 wherein steps a) and b) are executed in a single microprocessor.

14. The method of claim 13 wherein the single microprocessor is disposed in the tire.

15. The method of claim 12 wherein step a) is executed in a first microprocessor and step b) is executed in a second microprocessor.

16. The method of claim 15 wherein step a) and step b) are executed asynchronously.

17. The method of claim 16 wherein the first microprocessor is disposed in the tire.

* * * * *